United States Patent [19]

Adam et al.

[11] Patent Number: 4,931,481

[45] Date of Patent: Jun. 5, 1990

[54] PROCESS FOR THE PRODUCTION OF FOAMS BASED ON AROMATIC ISOCYANATES USING MG(OH)$_2$ AND THE FOAMS PRODUCED THEREBY

[75] Inventors: Norbert Adam, Cologne; Rolf Wiedermann, Odenthal, both of Fed. Rep. of Germany

[73] Assignee: Bayer Aktiengesellschaft, Bayerwerk, Fed. Rep. of Germany

[21] Appl. No.: 286,542

[22] Filed: Dec. 19, 1988

Related U.S. Application Data

[63] Continuation-in-part of Ser. No. 96,876, Sep. 15, 1987, abandoned.

[30] Foreign Application Priority Data

Sep. 27, 1986 [DE] Fed. Rep. of Germany .... 36 32 915
Sep. 10, 1987 [CA] Canada ................................ 546616
Sep. 16, 1987 [EP] European Pat. Off. ....... 87 113 516.6
Sep. 25, 1987 [JP] Japan ................................ 239139-87

[51] Int. Cl.$^5$ .......................................... C08G 18/14
[52] U.S. Cl. ..................................... 521/123; 521/107; 521/906
[58] Field of Search ..................... 521/123, 107, 906

[56] References Cited

U.S. PATENT DOCUMENTS

| | | | |
|---|---|---|---|
| 3,737,400 | 6/1973 | Kumasaka et al. ................. | 260/2.5 |
| 3,778,304 | 12/1973 | Thompson .......................... | 117/138 |
| 3,951,885 | 4/1976 | Thompson .......................... | 260/2.5 |
| 3,963,849 | 6/1976 | Thompson .......................... | 428/182 |
| 4,291,129 | 9/1981 | Kennedy ............................ | 521/106 |
| 4,315,078 | 2/1982 | Anorga .............................. | 521/119 |
| 4,458,036 | 7/1984 | Fesman ............................. | 521/107 |

FOREIGN PATENT DOCUMENTS

| | | |
|---|---|---|
| 189098 | 7/1986 | European Pat. Off. . |
| 58-225116 | 12/1983 | Japan . |
| 1035927 | 7/1966 | United Kingdom . |
| 1527668 | 10/1978 | United Kingdom . |

OTHER PUBLICATIONS

Plastics Technology, Jul. 1985, p. 70 et seq.

*Primary Examiner*—John Kight, III
*Assistant Examiner*—Dennis R. Daley
*Attorney, Agent, or Firm*—Joseph C. Gil; Richard E. L. Henderson

[57] ABSTRACT

Combustion modified foams are produced by reacting an organic aromatic polyisocyanate with an isocyanate reactive compound in the presence of a blowing agent and Mg(OH)$_2$. The Mg(OH)$_2$ is generally used in a quantity of from 4–100 parts by weight based on the foam taken as 100 parts by weight. Mg(OH)$_2$ having a particle size of from 0.5–50 μm is preferably used. The foams produced by the process are particularly useful in construction applications.

21 Claims, No Drawings

PROCESS FOR THE PRODUCTION OF FOAMS BASED ON AROMATIC ISOCYANATES USING MG(OH)₂ AND THE FOAMS PRODUCED THEREBY

This application is a continuation-in-part of application Ser. No. 07/096,876, filed Sept. 15, 1987, now abandoned.

BACKGROUND OF THE INVENTION

The present invention relates to a process for the production of combustion-modified foams and to the foams produced by that process.

Foams based on aromatic isocyanates are known to be flammable if they have not been treated in some manner to increase their fire resistance.

Side effects of combustion such as the optical smoke density (hereinafter called simply smoke density) may be more of a hazard in the event of fire than the fire itself. The smoke density is therefore becoming increasingly important in the discussions about the risks during fires involving isocyanate-based foams.

Attempts to protect foams based on aromatic isocyanates against ignition by the addition of metal compounds (such as antimony trioxide) have been made. Heavy metal oxides such as antimony trioxide can reduce the smoke density but often give rise to the risk of an increased heavy metal load.

The use of Mg(OH)₂ has already been proposed for various plastics materials, for example polyethylene and polypropylene (see, for example, in Plastics Technology, July 1985, page 70 et seq), and for polyurethanes based on hexamethylene diisocyanates (JA 58-225,116, Hitachi Cable), but not for foams based on aromatic isocyanates.

The use of Mg(OH)₂ as an ancillary agent in certain flame- or smoke-suppressing combinations has been disclosed for use with polyurethanes. E.g., U.S. Pat. No. 3,737,400 and British Patent No. 1,527,668. U.S. Pat. No. 3,737,400 discloses flame-suppressing mixtures for polyurethanes that may optionally contain Mg(OH)₂ and certain other inorganic compounds, but which must always contain at least one of ammonium sulfate or aluminum hydroxide hydrate. This reference states that the optional compounds, including Mg(OH)₂, would be ineffective if used alone. British Patent No. 1,527,668 similarly teaches inter alia the use of a mixture of Mg(OH)₂ and alumina trihydrate as a flame- or smoke-suppressing agent for polyurethanes.

Flame-proofing compositions which at least theoretically contain Mg(OH)₂ in combination with other substances have been disclosed for use with polyurethanes. U.S. Pat. No. 3,951,885 discloses magnesium oxychloride cement, a reaction product of magnesium chloride and magnesium oxide which is believed to be a complex containing or derived from Mg(OH)₂, MgCl₂, and water. See also U.S. Pat. Nos. 3,778,304 and 3,963,849.

The above-mentioned references do not teach the use of Mg(OH)₂ in the absence of inorganic compounds as a smoke-suppressing agent for polyurethanes exposed to fire.

SUMMARY OF THE INVENTION

It is an object of the present invention to provide foams based on aromatic isocyanates which produce a low smoke density in a fire without increasing the heavy metal load. It is also an object of this invention to provide a process for the production of such foams.

These and other objects which will be apparent to those skilled in the art are accomplished by incorporating Mg(OH)₂ into a foam forming mixture.

DETAILED DESCRIPTION OF THE INVENTION

The invention relates to the use of Mg(OH)₂ in the production of foams based on aromatic isocyanates and to the product foams. The Mg(OH)₂ does not have the disadvantage of the heavy metal load but has a smoke-suppressing effect in foams based on aromatic isocyanates. It is particularly surprising that this suppression also takes place in foams which contain combustion modifying agents containing phosphorus or nonionic halogen (that is, halogen in a form other than ionic halide).

In the present invention, it is preferable to use Mg(OH)₂ in a quantity of from 4 to 100 parts by weight, preferably in a quantity of from 4 to 50 parts by weight, more preferably in a quantity of from 4 to 10 parts by weight, based on the foam formed from an aromatic isocyanate taken as 100 parts by weight.

It is also preferred to use Mg(OH)₂ having a particle size of from 0.5 to 50 μm, most preferably from 5 to 40 μm.

Although it is more preferred to use Mg(OH)₂ alone as the smoke-reducing agent, it is also preferred to include Mg(OH)₂ during the production of aromatic isocyanate-based foams containing from 2 to 20 parts by weight, based on the foam taken as 100 parts by weight, of nonionic halogen and/or phosphorus compounds.

The production of foams based on isocyanates is known and is described, for example, in German Offenlegungsschriften Nos. 1,694,142, 1,694,215 and 1,720,768 and in Kunststoff-Handbuch, Volume VII, Polyurethane, edited by Vieweg and Hochtlen, Carl Hanser Verlag, Munich 1966 and in the new edition of this book, edited by G. Oertel, Carl Hanser Verlag, Munich, Vienna 1983. These are predominantly urethane and/or isocyanurate and/or allophanate and/or uretdione and/or urea and/or carbodiimide group-containing foams. In the present invention, Mg(OH)₂ is preferably used in the production of polyurethane and polyisocyanurate foams.

Suitable starting components for the production of the foams based on aromatic isocyanates include aromatic polyisocyanates of the type described, for example, by W. Siefken in Justus Liebigs Annalen der Chemie, 562, pages 75 to 136, preferably those corresponding to the formula $$Q(NCO)_n$$

in which n represents 2-4 and

Q represents an aromatic hydrocarbon radical containing from 6 to 15 (preferably from 6 to 13) carbon atoms, such as 1,3- and 1,4-phenylene diisocyanate, 2,4- and 2,6-tolylene diisocyanate and any mixtures of these isomers, diphenylmethane-2,4'- and/or -4,4'-diisocyanate and napthylene-1,5-diisocyanate. Triphenylmethane-4,4',4"-triisocyanate and polyphenylpolymethylene polyisocyanates of the type obtained by aniline formaldehyde condensation and subsequent phosgenation (described, for example, in GB Nos. 874,430 and 848,671) may also be used in the present invention. It is also possible to use the isocyanate-group-containing distillation residues produced during industrial isocyanate production, optionally dissolved in one or more of the above-mentioned polyisocyanates. It is also possible to use any mixtures of the above-mentioned polyisocyanates.

The commercially available aromatic polyisocyanates such as 2,4- and 2,6-tolylene diisocyanate and any mixtures of these isomers ("TDI"), polyphenyl-polymethylene polyisocyanates of the type produced by aniline formaldehyde condensation and subsequent phosgenation ("crude MDI"), and polyisocyanates containing carbodiimide groups, urethane groups, allophanate groups, isocyanurate groups, urea groups or biuret groups ("modified polyisocyanates") derived from 2,4- and/or 2,6-tolylene diisocyanate or from 4,4'- and/or 2,4'-diphenylmethane diisocyanate are particularly preferred.

Starting materials which are reactive towards isocyanates that may be used to produce foams in accordance with the present invention include compounds containing at least two hydrogen atoms and which generally have a molecular weight of from 400 to 10,000. These include amino group-, thiol group-, carboxyl group-, and preferably hydroxyl group-containing 8 hydroxyl groups, specifically those having a molecular weight of from 1000 to 5000, preferably from 800 to 3000. For example, polyesters, polyethers, polythioethers, polyacetals, polycarbonates and polyesteramides containing at least two, generally from 2 to 8, but preferably from 2 to 4, hydroxyl groups of the type known to be useful in the production of homogeneous and cellular polyurethanes. Such hydroxyl-group-containing materials are described in detail, for example, in DE-OS No. 3,430,285, on pages 10 to 18. Mixtures of isocyanate reactive compounds may also be used.

Starting materials which may optionally be used to produce foams in accordance with the present invention include compounds containing at least two hydrogen atoms which are reactive towards isocyanates and have a molecular weight of from 32 to 399. These include compounds containing hydroxyl groups and/or amino groups and/or thiol groups and/or carboxyl groups, preferably compounds containing hydroxyl groups and/or amino groups which serve as chain extenders or crosslinking agents. These compounds generally contain from 2 to 8, preferably from 2 to 4, hydrogen atoms capable of reacting with isocyanates. Mixtures of various compounds containing at least two hydrogen atoms capable of reacting towards isocyanates and having a molecular weight of from 32 to 399 can be used. Examples of such compounds are described in detail, for example, in DE-OS No. 3,430,285, on pages 19 to 23.

Suitable blowing agents for producing foams in accordance with the present invention include water and/or readily volatile inorganic or organic substances. Appropriate organic blowing agents include acetone, ethylacetate, and halogen-substituted alkanes such as monofluorotrichloromethane, chlorodifluoromethane, dichlorodifluoromethane. Suitable inorganic blowing agents include air, $CO_2$, and $N_2O$. A blowing action can also be achieved by addition of compounds which decompose at temperatures above room temperature with elimination of gases, such as nitrogen. Such compounds include, for example, azo compounds such as azodicarbonamide and azoisobutyric acid nitrile. Further examples of blowing agents and details about the use of blowing agents are disclosed in Kunststoff-Handbuch, Volume VII, edited by Vieweg and Hochtlen, Carl-Hanser-Verlag, Munich 1966, for example on pages 108 and 109, 453–455 and 507 to 510.

Substances which may optionally be used as auxiliaries and additives in the production of foams include catalysts, surface active additives, reaction retarders, cell regulators, pigments, fillers, and other anxiliaries and additives known in the art.

Catalysts of the known type, for example, tertiary amines such as triethylamine, tributylamine, N-methylmorpholine, N-ethylmorpholine, N,N,N',N'-tetramethyl-ethylene diamine, pentamethyl-diethylene triamine and higher homologs (DE-OS Nos. 2,624,527 and 2,624,528), 1,4-diazabicyclo[2.2.2]octane, N-methyl-N'-dimethylaminoethylpiperazine, bis(dimethylaminoalkyl)piperazines, DE-OS No. 2,636,787), N,N-dimethylbenzylamine, N,N-dimethylcyclohexylamine, N,N-diethylbenzylamine, bis(N,N-diethylaminoethyl) adipate, N,N,N',N'-tetramethyl-1,3-butanediamine, N,N-dimethyl-2-phenylethylamine, 1,2-dimethylimidazole, 2-methylimidazole, monocyclic and bicyclic amidines (DE-OS No. 1,720,633), bis(dialkylamino)alkyl ether (U.S. Pat. No. 3,330,782, DE-AS No. 030,558, DE-OS Nos. 1,804,361 and 2,618,280) and amide group- (preferably formamide group-) containing tertiary amines according to DE-OS Nos. 2,523,633 and 2,732,292) may be used. Known Mannich bases of secondary amines such as dimethylamine, aldehydes, preferably formaldehyde, ketones such as acetone, and phenols may also be used as catalysts. Tertiary amines containing hydrogen atoms which are active towards isocyanate groups as catalysts include triethanolamine, triisopropanolamine, N-methyldiethanolamine, N-ethyldiethanolamine, N,N-dimethylethanolamine, the reaction products thereof with alkylene oxides such as propylene oxide and/or ethylene oxide, as well as secondary-tertiary amines disclosed in DE-OS No. 2,732,292.

Suitable catalysts also include silaamines with carbon-silicon bonds of the type described, for example, in DE-PS No. 1,229,290 (corresponding to U.S. Pat. No. 3,620,984). 2,2,4-trimethyl-2-silamorpholine and 1,3-diethylaminoethyl-tetramethyl-disiloxane are specific examples.

Nitrogen-containing bases such as tetraalkyl ammonium hydroxides, alkali hydroxides such as sodium hydroxide, alkali phenolates such as sodium phenolate, and alkali alcoholates such as sodium methylate may also be used as catalysts. Hexahydrotriazines (DE-OS No. 1,769,043), as well as amide group- (preferably formamide group-) containing tertiary amines according to DE-OS Nos. 2,523,633 and 2,732,292 can also be used as catalysts.

Organic metal compounds, in particular organic tin compounds may also be used in accordance with the present invention as catalysts. Examples of organic tin compounds include sulfur-containing compounds such as di-n-octyl-tin mercaptide (DE-AS No. 1,769,367; U.S. Pat. No. 3,645,927), preferably tin(II) salts of carboxylic acids, such as tin(II) acetate, tin(II) octoate, tin(II) ethylhexoate and tin(II) laurate, and tin(IV) compounds such as dibutyl tin dilaurate.

All of the above-mentioned catalysts may also be used as mixtures.

Further examples of catalysts and details about the mode of operation of the catalysts are disclosed in Kunststoff-Handbuch, Volume VII, edited by Vieweg and Hochtlen, Carl-Hanser-Verlag, Munich 1966, for example on pages 96 to 102.

If a catalyst is used, it is generally used in a quantity of between about 0.001 and 10% by weight, based on the quantity of aromatic polyisocyanate.

Surface-active additives such as emulsifiers and foam stabilizers may also be included in foam forming mixtures. Suitable emulsifiers include the sodium salts of castor oil sulfonates or salts of fatty acids with amines such as oleic acid diethylamine and stearic acid diethanolamine. Alkali or ammonium salts of sulfonic acids such as dodecylbenzol sulfonic acid, dinaphthylmethane disulfonic acid (e.g. ricinoleic acid) and polymeric fatty acids may also be used as surface-active additives.

Suitable foam stabilizers include polyether siloxanes, particularly water-soluble polyether siloxanes. These compounds are generally made up in such a way that a copolymer of ethylene oxide and propylene oxide is bound to a polydimethyl siloxane radical. Foam stabilizers of this type are described, for example, in U.S. Pat. Nos. 2,834,748, 2,917,480 and 3,629,308. Polysiloxane polyoxyalkylene copolymers which are branched via allophanate groups (disclosed in DE-OS No. 2,558,523) are of particular interest in many cases.

Reaction retarders such as acid compounds (e.g. hydrochloric acid and organic acid halides); known cell regulators such as paraffins, fatty alcohols and dimethylpolysiloxanes; pigments; dyes: stabilizers against ageing and weathering effects; plasticizers: fungistatically and bacteriostatically acting substances; and fillers such as barium sulphate, diatomaceous earth, carbon black and whiting may also be included in the foam forming components used to produce foams in accordance with the present invention.

Further examples of surface-active additives, foam stabilizers, cell regulators, reaction retarders, flame-inhibiting substances, plasticizers, dyes, fillers and fungistatically and bacteriostatically active substances which may optionally be used according to the invention as well as details about the method of use and mode of operation of these additives are disclosed in Kunststoff-Handbuch, Volume VII, edited by Vieweg and Hochtlen, Carl-Hanser-Verlag, Munich 1966, for example on pages 103 to 113.

Any of various known combustion modifying agents containing phosphorus and/or halogen in a form other than ionic halide are useful in the process of this invention. Suitable combustion modifying agents of this type include trischloroethyl phosphate, dimethyl methanephosphonate, tricresyl phosphate, ammonium phosphate, ammonium polyphosphate, tris-chloroethylphosphate diphenyl-cresyl-phosphate as non-reactive types and reactive types like brominated phthalic esters, e.g. PHT-4-diol, Great Lakes, and a reaction product of dibromo-butene-diol and epichlorohydrine like Kol B 251, Solvay.

In the process of the present invention, the reaction components may be reacted by the known single stage process, the prepolymer process or the semiprepolymer process. Generally the reactants are used in quantities such that the NCO Index is from 50 to 300, preferably from 95 to 250. Examples of appropriate apparatus are described, for example, in U.S. Pat. No. 2,764,565. Details about processing devices which may be used in the practice of the present invention are disclosed in Kunststoff-Handbuch, Volume VII, edited by Vieweg and Hochtlen, Carl-Hanser-Verlag, Munich 1966, for example on pages 121 to 205.

Foam production may take place in closed molds. In this case, the reaction mixture is introduced into a mold. Suitable mold materials include metals (for example, aluminum) and plastics (for example, epoxide resins). The reaction mixture foams in the mold and forms the shaped article. Foaming in the mold can be carried out in such a way that the molded product has a cellular structure on its surface. Foaming may also be carried out in such a way that the molded product has a dense skin and a cellular core. It is also possible to mold in such a way that sufficient reaction mixture is introduced into the mold for the foam formed to just fill the mold. It is also possible to introduce more foamable reaction mixture into the mold than is required to fill the mold cavity with foam. In the latter case, "overcharging" takes place. Such a mode of operation is disclosed, for example, in U.S. Pat. Nos. 3,178,490 and 3,182,104.

When carrying out foaming in a mold, known "external release agents" such as silicon oils are often used. However, so-called "internal release agents" may also be used, optionally mixed with external release agents, of the type described for example, in DE-OS Nos. 2,121,670 and 2,307,587.

Foams can also be produced by block foaming or by the known laminator process.

The foams obtainable by the invention may be used as insulating boards such as roof insulation.

The invention is further illustrated but is not intended to be limited by the following examples in which all parts and percentages are by weight unless otherwise specified.

EXAMPLES

The invention is described in more detail in the following Examples and Comparison Examples.

Examples B and F (according to the invention) have lower smoke densities than Comparison Examples A and E. Comparison Example C shows that the use of phosphorus and nonionic halogen leads to an increase in the smoke density relative to Comparison Example A. However, the smoke density is also reduced relative to Comparison Example C by the use of $Mg(OH)_2$, as shown by Example D (according to the invention).

As shown in Examples G and H in comparison with Example B, the average particle size of the $Mg(OH)_2$ has a considerable influence on smoke suppression. $Mg(OH)_2$ is most preferably used in particle sizes of from 25 to 40 $\mu$m.

The smoke density is examined by the testing method described in ASTM-D-2843-70. The data show the "smoke density ratings" determined by this method.

| EXAMPLE | A | B | C | D | E | F | G | H |
|---|---|---|---|---|---|---|---|---|
| Sugar/propyleneglycolpropylene-oxide-polyether, OH No. 470 | 28.3 | 28.3 | 28.3 | 28.3 | 28.3 | 28.3 | 28.3 | 28.3 |
| Sugar/ethyleneglycolpropylene-oxide-polyether, OH No. 450 | 12.1 | 12.1 | 12.1 | 12.1 | 12.1 | 12.1 | 12.1 | 12.1 |
| Polyester of phthalic acid, adipic acid, diethyleneglycol, OH No. 200 | 40.4 | 40.4 | 40.4 | 40.4 | 40.4 | 40.4 | 40.4 | 40.4 |

-continued

| EXAMPLE | A | B | C | D | E | F | G | H |
|---|---|---|---|---|---|---|---|---|
| Emulsifier (reaction product of nonylphenol and ethylene oxide) | 4.3 | 4.3 | 4.3 | 4.3 | 4.3 | 4.3 | 4.3 | 4.3 |
| Stabilizer Polyurax ® SR 242 (produced by BP Chemicals) | 1 | 1 | 1 | 1 | 1 | 1 | 1 | 1 |
| Potassium acetate, 25% in diethylene glycol | 3.8 | 3.8 | 3.8 | 3.8 | 4.5 | 4.5 | 3.8 | 3.8 |
| Dimethyl-cyclohexylamine | 0.4 | 0.34 | 0.4 | 0.4 | 0.5 | 0.5 | 0.34 | 0.34 |
| Water | 0.5 | 0.5 | 0.5 | 0.5 | 0.5 | 0.5 | 0.5 | |
| Tris-(2-chloroethyl)phosphate | — | — | 15 | 15 | — | — | — | — |
| $Mg(OH)_2$, particle 20μm, type FR 003 (supplied by Lehmann and Voss) | — | 15 | — | 15 | — | 15 | — | — |
| $Mg(OH)_2$, particle 3 μm, type KJ (supplied by Lehmann and Voss) | — | — | — | — | — | — | — | 15 |
| $Mg(OH)_2$, particle 0.6 μm, type AJ (supplied by Lehmann and Voss) | — | — | — | — | — | — | — | — |
| Trichloromonofluoromethane | 30 | 30 | 30 | 30 | 34 | 34 | 30 | 30 |
| Crude MDI (Desmodur ® 44 V 20, Bayer AG) | 126 | 126 | 126 | 126 | 185 | 185 | 126 | 126 |
| Smoke Density Rating (according to ASTM D-2843 - 70) | 13 | 8 | 15 | 11 | 12 | 9 | 12 | 12 |
| Isocyanate Index | 156 | 156 | 156 | 156 | 226 | 226 | 156 | 156 |
| Bulk Density (kg/m³) | 33 | 35 | 35 | 38 | 37 | 38 | 36 | 35 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A method for reducing smoke in a foam exposed to fire, wherein said foam is prepared by reacting a mixture of
   (a) an organic aromatic polyisocyanate and
   (b) an isocyanate-reactive compound in the presence of
   (c) a blowing agent, comprising adding to the reaction mixture a smoke-reducing agent consisting of $Mg(OH)_2$ alone or in the presence of a combustion modifying agent containing phosphorus or nonionic halogen.

2. The method of claim 1 wherein the smoke-reducing agent is $Mg(OH)_2$ alone.

3. The method of claim 2 wherein the $Mg(OH)_2$ is included in a quantity of from 4 to 100 parts by weight based on the foam taken as 100 parts by weight.

4. The method of claim 2 wherein the $Mg(OH)_2$ is included in a quantity of from 4 to 50 parts by weight based on the foam taken as 100 parts by weight.

5. The method of claim 2 wherein the $Mg(OH)_2$ is included in a quantity of from 4 to 10 parts by weight based on the foam taken as 100 parts by weight.

6. The method of claim 2 wherein the $Mg(OH)_2$ has a particle size of from 0.5 to 50 μm.

7. The method of claim 2 wherein the $Mg(OH)_2$ has a particle size of from 5 to 40 μm.

8. The method of claim 3 wherein the $Mg(OH)_2$ has a particle size of from 0.5 to 50 μm.

9. The method of claim 3 wherein the $Mg(OH)_2$ has a particle size of from 5 to 40 μm.

10. The method of claim 2 wherein the isocyanate reactive compound is a polyhydroxyl compound.

11. The method of claim 2 for reducing smoke in a foam exposed to fire, wherein said foam is prepared by reacting a mixture of
    (a) an organic aromatic polyisocyanate and
    (b) a polyhydroxyl compound in the presence of
    (c) a blowing agent, comprising adding to the mixture a smoke-reducing agent consisting of $Mg(OH)_2$ having a particle size of from 5 to 40 μm in a quantity of from 4 to 10 parts by weight based on the foam taken as 100 parts by weight.

12. The method of claim 1 wherein the smoke-reducing agent is $Mg(OH)_2$ in the presence of 2-20 parts by weight, based on the foam taken as 100 parts by weight, of a combustion modifying agent containing phosphorus or nonionic halogen.

13. The method of claim 12 wherein the $Mg(OH)_2$ is included in a quantity of from 4 to 100 parts by weight based on the foam taken as 100 parts by weight.

14. The method of claim 12 wherein the $Mg(OH)_2$ is included in a quantity of from 4 to 50 parts by weight based on the foam taken as 100 parts by weight.

15. The method of claim 12 wherein the $Mg(OH)_2$ is included in a quantity of from 4 to 10 parts by weight based on the foam taken as 100 parts by weight.

16. The method of claim 12 wherein the $Mg(OH)_2$ has a particle size of from 0.5 to 50 μm.

17. The method of claim 12 wherein the $Mg(OH)_2$ has a particle size of from 5 to 40 μm.

18. The method of claim 13 wherein the $Mg(OH)_2$ has a particle size of from 0.5 to 50 μm.

19. The method of claim 13 wherein the $Mg(OH)_2$ has a particle size of from 5 to 40 μm.

20. The method of claim 12 wherein the isocyanate reactive compound is a polyhydroxyl compound.

21. The method of claim 12 for reducing smoke gas in a foam exposed to fire, wherein said foam is prepared by reacting a mixture of
    (a) an organic aromatic polyisocyanate and
    (b) a polyhydroxyl compound in the presence of
    (c) a blowing agent, comprising adding to the mixture a smoke-reducing agent consisting of $Mg(OH)_2$ having a particle size of from 5 to 40 μm in a quantity of from 4 to 100 parts by weight based on the foam taken as 100 parts by weight, in the presence of 2-20 parts by weight, based on the foam taken as 100 parts by weight, of a combustion modifying agent containing phosphorus or nonionic halogen.

* * * * *